US007206886B2

(12) United States Patent
Horton et al.

(10) Patent No.: US 7,206,886 B2
(45) Date of Patent: Apr. 17, 2007

(54) DATA ORDERING TRANSLATION BETWEEN LINEAR AND INTERLEAVED DOMAINS AT A BUS INTERFACE

(75) Inventors: Robert S. Horton, Colchester, VT (US); Clarence R. Ogilvie, Huntington, VT (US); Charles S. Woodruff, Charlotte, VT (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 11/064,569

(22) Filed: Feb. 24, 2005

(65) Prior Publication Data
US 2006/0190660 A1 Aug. 24, 2006

(51) Int. Cl.
*G06F 13/00* (2006.01)
(52) U.S. Cl. .................. 710/307; 710/310; 710/311
(58) Field of Classification Search ............. 710/307, 710/310, 311
See application file for complete search history.

(56) References Cited

U.S. PATENT DOCUMENTS

| 4,281,381 | A | 7/1981 | Ahuja et al. |
|---|---|---|---|
| 5,038,346 | A | 8/1991 | Courtois |
| 5,546,546 | A | 8/1996 | Bell et al. |
| 5,581,705 | A | 12/1996 | Passint et al. |
| 5,740,409 | A | 4/1998 | Deering |
| 5,778,096 | A | 7/1998 | Stearns |
| 5,835,739 | A | 11/1998 | Bell et al. |
| 5,841,973 | A | 11/1998 | Kessler et al. |
| 5,893,151 | A | 4/1999 | Merchant |
| 6,021,451 | A | 2/2000 | Bell et al. |
| 6,124,868 | A | 9/2000 | Asaro et al. |
| 6,247,086 | B1 | 6/2001 | Allingham |
| 6,363,438 | B1 | 3/2002 | Williams et al. |
| 6,405,276 | B1 | 6/2002 | Chen et al. |
| 6,449,699 | B2 | 9/2002 | Franke et al. |
| 6,571,308 | B1 | 5/2003 | Reiss et al. |
| 6,668,309 | B2 | 12/2003 | Bachand et al. |
| 6,694,383 | B2 | 2/2004 | Nguyen et al. |
| 6,725,296 | B2 | 4/2004 | Craddock et al. |
| 6,799,317 | B1 | 9/2004 | Heywood et al. |
| 6,801,207 | B1 | 10/2004 | Tischler et al. |
| 6,801,208 | B2 | 10/2004 | Keshava et al. |

(Continued)

OTHER PUBLICATIONS

John L. Hennessy et al., *Computer Architecture: A Quantitative Approach*, Second Edition, Chapter 8: Multiprocessors, Morgan Kaufmann Publishing, pp. 638-639 and 680 (1996).

*Primary Examiner*—Glenn A. Auve
(74) *Attorney, Agent, or Firm*—Heslin Rothenberg Farley & Mesiti, P.C.

(57) ABSTRACT

A bus bridge for coupling between a first bus and a second includes: at least one data buffer; data load logic and data unload logic. The data load logic places received data in the at least one data buffer, wherein the data is received at the bus bridge from across the first bus in a first data ordering. The data unload logic automatically translates the received data from the first data ordering to a second data ordering during unloading of the data from the at least one data buffer for transfer across the second bus, wherein the first data ordering and the second data ordering are each a different one of a linear data ordering and an interleaved data ordering.

20 Claims, 4 Drawing Sheets

U.S. PATENT DOCUMENTS

| | | |
|---|---|---|
| 6,816,161 B2 | 11/2004 | Lavelle et al. |
| 6,820,143 B2 | 11/2004 | Day et al. |
| 6,820,174 B2 | 11/2004 | Vanderwiel |
| 6,889,284 B1 * | 5/2005 | Nizar et al. ................. 710/315 |
| 6,978,319 B1 | 12/2005 | Rostoker et al. |
| 2004/0117592 A1 | 6/2004 | Day et al. |
| 2004/0162946 A1 | 8/2004 | Day et al. |
| 2004/0168011 A1 * | 8/2004 | Hemming ..................... 711/5 |
| 2004/0263519 A1 | 12/2004 | Andrews et al. |
| 2006/0069788 A1 | 3/2006 | Blackmore et al. |
| 2006/0156199 A1 * | 7/2006 | Palanki et al. .............. 714/776 |

* cited by examiner fig. 1 fig. 2 fig. 3 fig. 4

DATA ORDERING TRANSLATION BETWEEN LINEAR AND INTERLEAVED DOMAINS AT A BUS INTERFACE

CROSS REFERENCE TO RELATED APPLICATIONS

This application contains subject matter which is related to the subject matter of the following applications, each of which is assigned to the same assignee as this application and each of which is hereby incorporated herein by reference in its entirety:

"Method and System For Ordering Requests at a Bus Interface", Ogilvie et al., Ser. No. 11/064,728, filed Feb. 24, 2005, and published on Aug. 24, 2006 as United States Patent Application Publication No. US 2006/0190651 A1;

"Method and System for Controlling Forwarding or Terminating of a Request at a Bus Interface Based on Buffer Availability", Ogilvie et al., Ser. No. 11/064,570, filed Feb. 24, 2005, and published on Aug. 24, 2006 as United States Patent Application Publication No. US 2006/0190661 A1;

"Computer System Bus Bridge", Brian et al., Ser. No. 11/064,568, filed Feb. 24, 2005, and published on Aug. 24, 2006 as United States Patent Application Publication No. US 2006/0190659 A1;

"Apparatus and Method for Transaction Tag Mapping Between Bus Domains", Kautzman et al., Ser. No. 11/064,567, filed Feb. 24, 2005, and published on Aug. 24, 2006 as United States Patent Application Publication No. US 2006/0190655 A1;

"Transaction Flow Control Mechanism for a Bus Bridge", Ogilvie et al., Ser. No. 11/064,722, filed Feb. 24, 2005, and published on Aug. 24, 2006 as United States Patent Application Publication No. US 2006/0190622 A1;

"Pipeline Bit Handling Circuit and Method for a Bus Bridge", Drebmel et al., Ser. No. 11/064,744, filed Feb. 24, 2005, and published on Aug. 24, 2006 as United States Patent Application Publication No. US 2006/0290667 A1; and "Computer System Architecture", Biran et al., Ser. No. 11/064,745, filed Feb. 24, 2005, and published on Aug. 24, 2006 as United States Patent Application Publication No. US 2006/0190668 A1.

TECHNICAL FIELD

The present invention relates in general to the field of data transfer in a computer system, and more particularly, to methods and systems for data ordering translation between linear and interleaved domains at a bus interface.

BACKGROUND OF THE INVENTION

Computer systems generally include multiple agents, such as microprocessors, storage devices, display devices, etc., which are interconnected via a system bus. The system bus operates to transfer address, data and control signals between these agents. Certain computer systems employ multiple busses, in which various agents are coupled to one or more busses. Typically, each agent is coupled to a single bus.

Bus bridges are often utilized in multiple-bus systems to connect the busses and thereby allow agents coupled to one type of bus to access agents coupled to another type of bus. The function of the bus bridge typically involves transferring commands between two busses. The commands (e.g., read or write commands) transferred by the bus bridge often have data associated with them which require buffering.

SUMMARY OF THE INVENTION

Although various bus bridge implementations exist in the art, it is believed advantageous to provide a method and system which provide further bus bridge functionality that allows for data ordering translation between linear and interleaved domains at the bus bridge. The present invention provides such functionality.

The shortcomings of the prior art are overcome and additional advantages are provided through a method which includes: receiving at a bus interface data in a first data ordering; and automatically translating the received data at the bus interface from the first data ordering to a second data ordering, wherein the first data ordering and the second data order are each a different one of a linear data ordering and an interleaved data ordering.

In another aspect, a system is provided which includes: means for receiving data at a bus interface in a first data ordering; and means for automatically translating the received data at the bus interface from the first data ordering to a second data ordering, wherein the first data ordering and the second data ordering are each a different one of a linear data ordering and an interleaved data ordering.

In a further aspect, a system is provided which includes a bus bridge for coupling between a first bus and a second bus. The bus bridge includes at least one data buffer, data load logic and data unload logic. The data load logic places received data in the at least one data buffer, wherein the data is received at the bus bridge from across the first bus in a first data ordering. The data unload logic automatically translates the received data from the first data ordering to a second data ordering during unloading of the data from the at least one data buffer for transfer across the second bus. The first data ordering and the second data ordering are each a different one of a linear data ordering and an interleaved data ordering.

Further, additional features and advantages are realized through the techniques of the present invention. Other embodiments and aspects of the invention are described in detail herein and are considered a part of the claimed invention.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

BEST MODE FOR CARRYING OUT THE INVENTION

As used herein, a "request" includes any transaction, reflected transaction, command, reflected command, or other type of request, response or event, etc., associated with transferring data.

Figure 1:
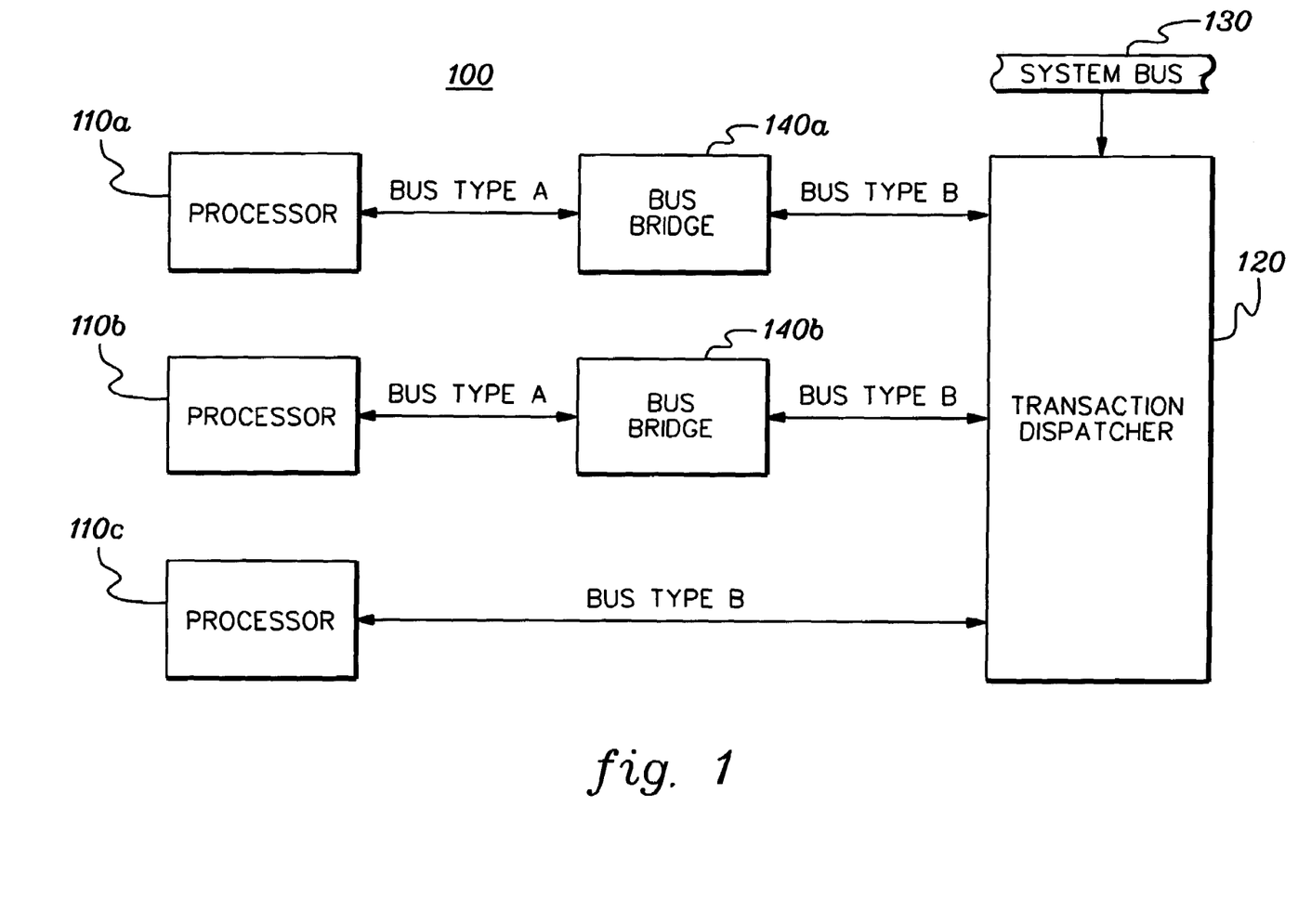
FIG. 1 depicts a partial block diagram representation of a computer system employing bus bridges between different bus types, which may employ one or more aspects of the present invention.

FIG. 1 depicts one embodiment of a computer system, generally denoted 100, to employ one or more aspects of the present invention. In system 100, multiple processors 110a, 110b, 110c are coupled to a system bus 130 via a transaction dispatcher 120. In this example, transaction dispatcher 120 comprises arbitration logic which decides which request to perform next, and may include a dispatch unit or address concentrator. Transaction dispatcher 120 communicates with processors 110a, 110b and 110c via respective busses of bus type B. In this multiprocessor environment, processors 110a & 110b are assumed to communicate using busses of bus type A, and thus, bus bridges 140a & 140b are employed to convert requests between bus type A and bus type B, both of which are assumed to comprise coherent busses. Thus, processor 110a and processor 110b communicate with transaction dispatcher 120 via their respective bus bridges 140a, 140b. By way of example, bridges 140a, 140b are assumed to maintain coherency via snooping. One example of computer system 100, wherein cache coherency is maintained via snooping, is a PowerPC 750 System offered by International Business Machines Corporation of Armonk, N.Y.

Those skilled in the art will note that the bus interface disclosed herein can be employed to convert requests between any two types of busses. In one aspect, the present invention provides additional functionality to a bus interface which allows automatic translation of data ordering between a linear data ordering and an interleaved data ordering. As known in the art, linear data ordering refers to a sequential address ordering of data words, while interleaved data ordering refers to a non-sequential address ordering of data words.

Figure 2:
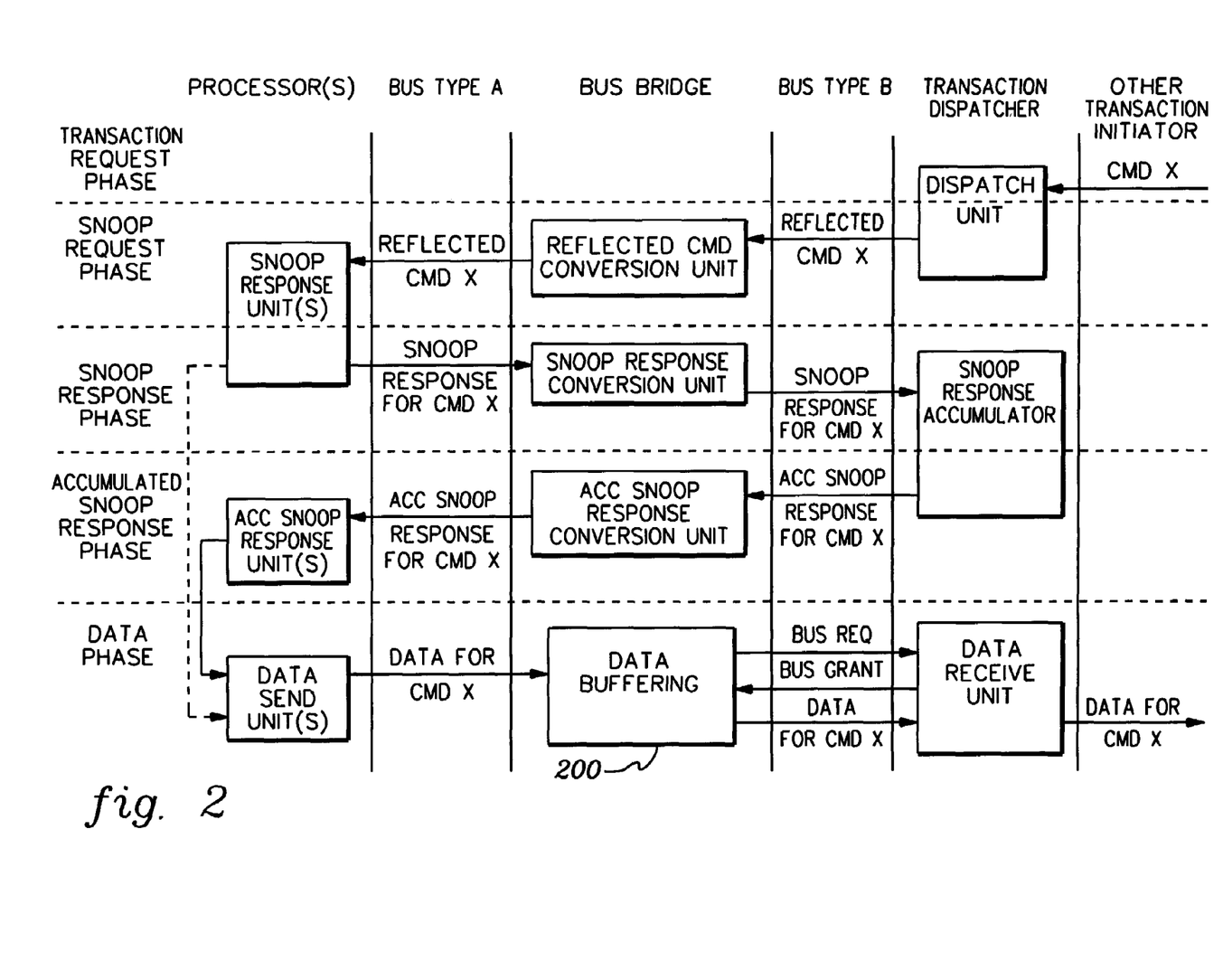
FIG. 2 depicts one example of a generic request handling protocol between bus type A and bus type B employing a coherent bus bridge, in accordance with an aspect of the present invention.

FIG. 2 depicts one example of a general request processing sequence (in accordance with an aspect of the present invention) between bus type A and bus type B in a computing environment maintaining cache coherency via snooping. During a transaction request phase, a transaction is initiated by a master, and the transaction initiator issues a command (CMD) X. This command is received at the transaction dispatcher where it is reflected back towards the processor memory outlets (i.e., caches) in the system that require coherency. This reflected command X is issued during a snoop request phase of the transaction processing. The bus bridge converts this reflected command and forwards the converted command to the respective snoop response unit(s) of the processor(s) coupled thereto via bus type A. Responsive to receipt of the reflected command, a snoop response phase is entered where the processor issues a snoop response for command X. The snoop response(s) is issued according to each processor's cache contents. This snoop response is converted from bus type A to bus type B via a snoop response conversion unit within the bus bridge and is sent to a snoop response accumulator within the transaction dispatcher.

The transaction dispatcher then generates an accumulated snoop response (Acc Snoop Response) and puts this accumulated response onto bus type B. The bus bridge converts the accumulated snoop response in an accumulated snoop response conversion unit and sends it to an accumulated snoop response unit(s) of the respective processor(s) via bus type A. The snoop response conversion happens in a similar manner as conversion of commands that were initiated by the master. Responsive to receipt of the accumulated snoop response, one processor sends data during a data phase (if necessary) depending on command X and the accumulated snoop response. This data is forwarded across bus type A to dedicated buffers 200 of the particular request type in the bus bridge. The bus bridge accepts the data from the processor and puts the data into one buffer of the number of buffers of the particular request type. This data buffer then requests access to bus type B, and once granted, forwards the data for command X to a data receive unit in the transaction dispatcher, after which the data is forwarded to the master initiating the request for data. Note that multiple overlapping requests of a particular type can be processed by the bus bridge provided that a buffer of the number of dedicated buffers of the particular request type is available for accommodating data during a data phase of each request.

As noted above, in one aspect, the present invention provides additional functionality to a bus bridge wherein data of a first addressing bus protocol, e.g., employing linear data ordering, is automatically translated to a second addressing bus protocol, e.g., employing interleaved data ordering. In one example, the requester requesting the data is assumed to request the data in interleaved order. Although described herein with reference to translating received read data at a bus bridge from linear data ordering to interleaved data ordering, the concepts described are also applicable to translating from interleaved data ordering to linear data ordering, or between other types of data ordering of different addressing bus protocols employed by different bus types coupled to the bus bridge, and may be responsive to a request other than a read request. This translation facility is particularly beneficial in systems where restrictions on one or more busses of the computer system prevent data from always being returned employing, for example, interleaved data ordering, because one or more masters coupled to a bus may be incapable of employing interleaved data ordering.

Figure 3:
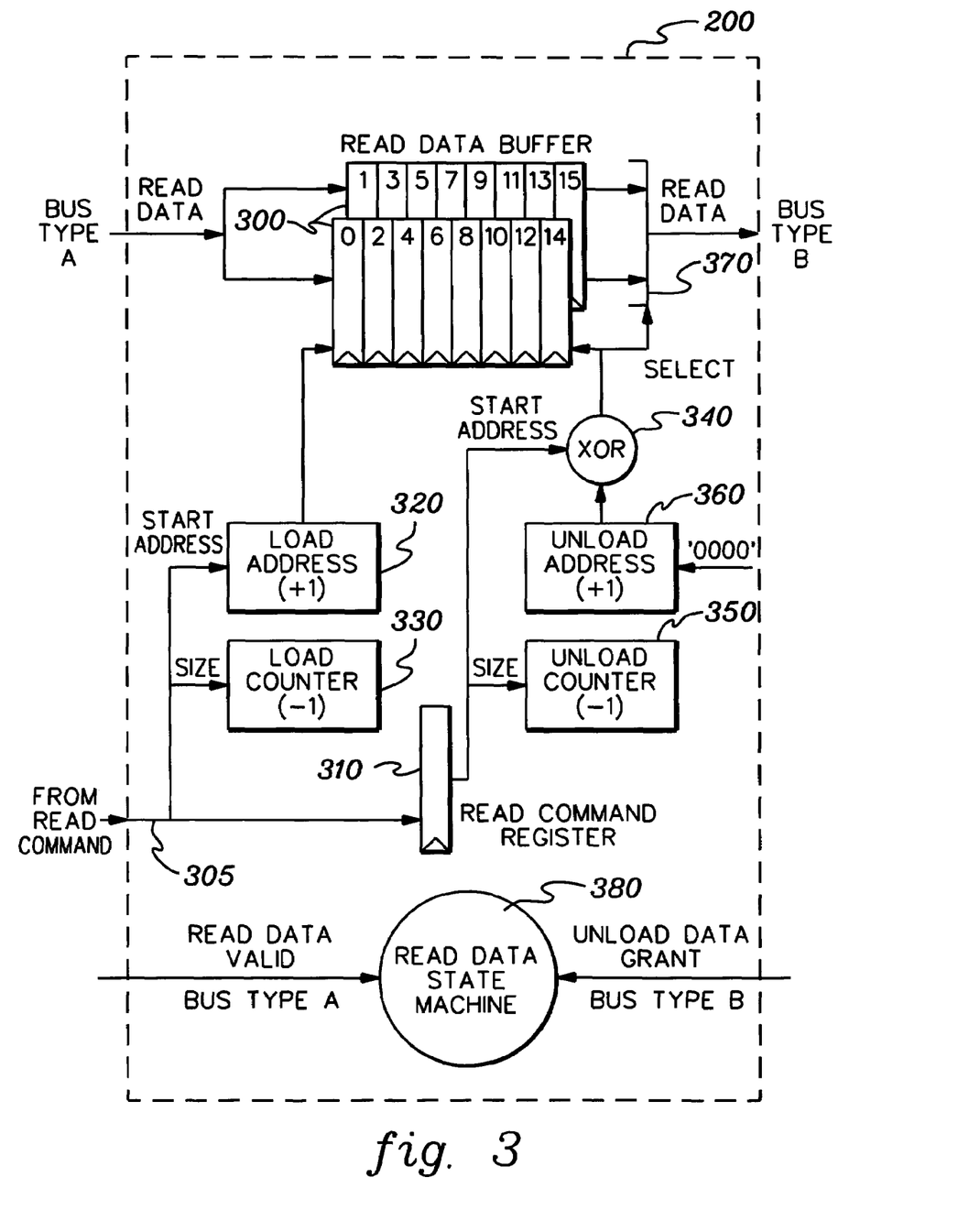
FIG. 3 depicts one example of a read data buffer and associated logic for translating read data received at the bus bridge in a linear data ordering to an interleaved data ordering, in accordance with an aspect of the present invention.

FIG. 3 is a partial block diagram of one embodiment of data buffering 200 showing one read data buffer comprising multiple registers 300. Additionally, FIG. 3 depicts a set of counter and address generation logic for the buffer which is employed in controlling coordination of data translation and transfer through the bus bridge. Pursuant to a read request, read data is transferred during the data phase of the request processing protocol from bus type A into an assigned read buffer of a plurality of dedicated read buffers within the data buffering of the bus bridge. In one example, there may be sixteen 64 bit registers 300 to accommodate one 128 byte cache line in each read data buffer. Further, by way of example, a bus bridge may comprise four read data buffers. Each read data buffer receives, in one implementation, sequentially ordered read data from bus type A (i.e., data employing linear data ordering) and holds the data for interleaved reordering and output on bus type B, in accordance with an aspect of the present invention. The size of each read data buffer is assumed to be equal to or larger than the size of the read data received at the bus bridge.

After the accumulated snoop response phase of a read command, a read data buffer is assigned to the read command and may be given a ticket order such as described in the above-incorporated, co-filed patent application entitled "Method and System for Ordering Requests at a Bus Interface." Along with assigning the read command a read data buffer and a ticket order, certain attributes 305 of the read command are loaded into a read command register 310. These attributes include the start address of the read data and the size of the read data. At this time, the read data state machine 380, which coordinates the loading of data into and the unloading of data from the read data buffer, is awaiting receipt of a read data valid signal on bus type A, i.e., is awaiting receipt of a tag hit. Once received, the read data on bus type A is loaded into one or more of the read data registers 0–15 of the assigned read data buffer. A load address generator 320 is initialized to the start address of the data read from the read command 305, which is used as an index to place the read data into an appropriate register of the read data buffer array. Thereafter, read data is placed in sequential locations of the read data buffer via the load address generator 320, which employs a simple incrementor (+1) to generate each successive address. Commensurate with beginning loading of the read data, a load data counter 330 is initialized to the read data size field of the read command 305. This counter is decremented (−1) with each load data cycle during which data is written into the read data buffer array (i.e., is decremented with each write strobe into the buffer array). When load counter 330 reaches value '0000' the read data is fully loaded into the read data buffer, and the read data state machine 380 is allowed to advance beyond the load read data state.

After the loading process is complete, the read data buffer state machine 380 waits for a data unload grant signal on bus type B, at which point the read data buffer state machine begins to unload the buffered data onto bus type B. An unload address from an address generator 360 is used in conjunction with a bitwise exclusive OR (XOR) of the read data start address from the read command register 310. Counter 360 is incremented (+1) with each unload data cycle during which data is transferred from the read data buffer. Output of the 'XOR' function is an address value which determines which read data buffer register contents to transfer to bus type B. It is this 'XOR' function that creates the requested data word first, interleaved order required by, for example, processor cache-line fill sequences. Before the unload state begins, unload address generator 360 is initialized to value '0000', and an unload data counter 350 is initialized from a data size field of the read command held in register 310. Counter 350 decrements (−1) with each unload data cycle during which data is transferred from the read data buffer array to bus type B. When counter 350 reaches value '0000', the read data buffer state machine is allowed to advance to an unload finish state.

In one example the address select bits output from the 'XOR' function 340 may be defined as follows:

Select [0:2]←Start Addr [0:2] XOR Index Count [0:2]
Select [3]←Index Count [3]

An example of interleaved addressing is given below. The Start Address is set to 6 (0110) and the output Select value is shown to step in the proper interleaved fashion:

StartAddress=0110
  XOR
Index Count=>0000→0110<=Select
  0001→0111
  0010→0100
  0011→0101
  0100→0010
  0101→0011
  0110→0000
  0111→0001
  1000→1110
  1001→1111
  1010→1100
  1011→1101
  1100→1010
  1101→1011
  1110→1000
  1111→1001

As an enhancement, the translation logic of FIG. 3 can be employed to transition read data between, for example, a 128-bit wide bus type A to a 64-bit wide bus type B. This can be accomplished by, for example, multiplexing 370 the data bits of the read data transfer from the read data buffer down to 64 bits wide when outputting the read data from the read data buffer.

Figure 4:
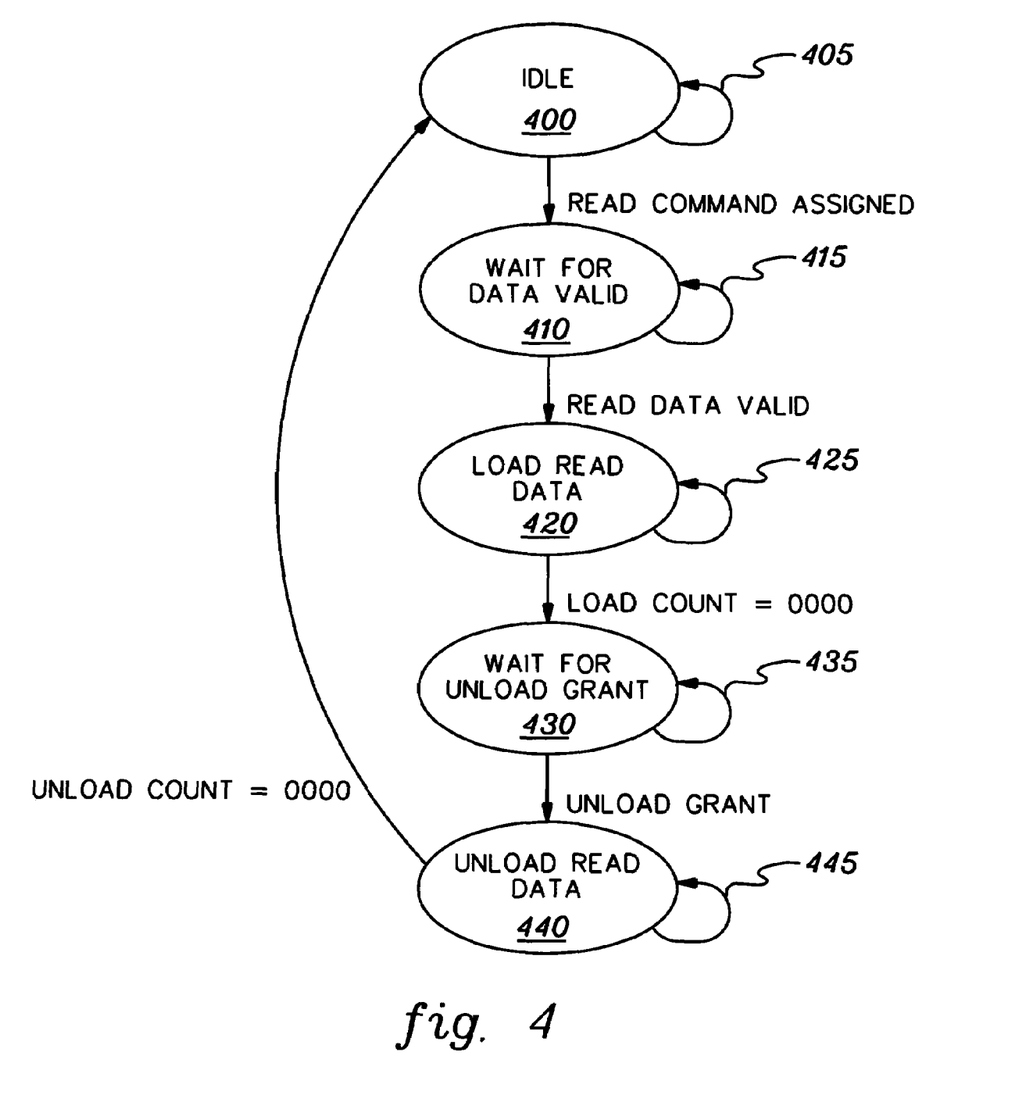
FIG. 4 depicts one embodiment of a read data state machine for the read data buffer and translation logic of FIG. 3, in accordance with an aspect of the present invention.

FIG. 4 depicts one embodiment of the logic implemented by read data state machine 380 of a read data buffer. The logic remains 405 in an idle state 400 until a read command is assigned to the associated read command buffer. With this assignment, the state machine transitions to a wait for data valid state 410, where it remains 415 until a read data valid signal is received, e.g., on bus type A. With receipt of this signal, the state machine transitions to begin loading the read data 420 into the associated read data buffer. This process continues 425 until the load counter reaches a value of '0000'. Once all data has been loaded into the read data buffer, the state machine transitions to a wait for unload data grant state 430. The logic remains 435 in this state until the unload data grant signal is received, for example, from across bus type B. With receipt of the unload data grant signal, the logic transitions to an unload read data state 440, where it remains 445 until the unload counter has reached a value of '0000', meaning that all read data has been transferred from the read data buffer of the bus bridge.

To summarize, those skilled in the art will note that provided herein are a method and system implementable at a bus interface for automatically translating received data between a linear data ordering and an interleaved data ordering. A set of counters and address conversion logic is employed for the control and coordination of the automated translation of the read data between the different data orderings. Additionally, commensurate with the data ordering translation, read data can be multiplexed or demultiplexed to transition between busses of different width.

The capabilities of one or more aspects of the present invention can be implemented in software, firmware, hardware or some combination thereof.

One or more aspects of the present invention can be included in an article of manufacture (e.g., one or more computer program products) having, for instance, computer usable media. The media has therein, for instance, computer readable program code means or logic (e.g., instructions, code, commands, etc.) to provide and facilitate the capabilities of the present invention. The article of manufacture can be included as a part of a computer system or sold separately.

Additionally, at least one program storage device readable by a machine embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A method comprising:
    receiving at a bus interface data having a first data ordering;
    automatically translating the received data at the bus interface from the first data ordering to a second data ordering, wherein the first data ordering and the second data ordering are each a different one of a linear data ordering and an interleaved data ordering;
    wherein the data is received at the bus interface pursuant to a request, and wherein the method further comprises obtaining from the request a start address and a size of data associated with the request to be translated, and employing the start address and the size of the data during the automatically translating of the data from the first data ordering to the second data ordering; and
    wherein the second data ordering is the interleaved data ordering, and the bus interface includes at least one data buffer comprising a plurality of registers, and wherein the method further includes outputting data with the interleaved data ordering in successive unload data cycles from the plurality of registers of the at least one data buffer by exclusive ORing the start address of the data with a current value of an unload address generator, wherein the unload address generator is initialized to zero and is incremented with each successive unload data cycle of the outputting of the data.

2. The method of claim 1, wherein the data is received at the bus interface responsive to a read request initiated by a requestor, and wherein the requestor requests the data in the second data ordering.

3. The method of claim 1, wherein the bus interface comprises a bus bridge coupled between a first bus and a second bus, and wherein data having the first data ordering is received at the bus bridge from across the first bus, and is output from the bus bridge across the second bus employing the second data ordering.

4. The method of claim 3, wherein the first bus and the second bus have different bus widths.

5. The method of claim 1, wherein the request is a read request and the bus interface includes at least one read data buffer comprising a plurality of registers, and wherein the method further comprises employing the start address to point to a particular register of the plurality of registers of the at least one read data buffer to begin placing the received data in the at least one read data buffer, and placing the received data in successively incremented registers of the at least one read data buffer until the size of the requested data is reached.

6. The method of claim 1, further comprising repeating the exclusive ORing of the start address of the data and the current value of the unload address generator in successive unload data cycles until reaching the size of the associated data.

7. The method of claim 1, wherein the data comprises multiple data words, and wherein the outputting comprises beginning the outputting of data from the plurality of registers of the at least one data buffer with an initial target data word of the request.

8. A system comprising:
    means for receiving at a bus interface data in a first data ordering;
    means for automatically translating the received data at the bus interface from the first data ordering to a second data ordering, wherein the first data ordering and the second data ordering are each a different one of a linear data ordering and an interleaved data ordering;
    wherein the data is received at the bus interface pursuant to a request, and wherein the system further comprises means for obtaining from the request a start address and a size of data associated with the request to be translated, and for employing the start address and the size of the data during the automatically translating of the data from the first data ordering to the second data ordering; and
    wherein the second data ordering is the interleaved data ordering, and the bus interface includes at least one data buffer comprising a plurality of registers, and wherein the system further includes means for outputting data with the interleaved data ordering in successive unload data cycles from the plurality of registers of the at least one data buffer by exclusive ORing the start address of the data with a current value of an unload address generator, wherein the unload address generator is initialized to zero and is incremented with each successive unload data cycle of the outputting of the data.

9. The system of claim 8, wherein the data is received at the bus interface responsive to a read request initiated by a requestor, and wherein the requestor requests the data in the second data ordering.

10. The system of claim 8, wherein the bus interface comprises a bus bridge coupled between a first bus and a second bus, and wherein data having the first data ordering is received at the bus bridge from across the first bus, and is output from the bus bridge across the second bus employing the second data ordering.

11. The system of claim 10, wherein the first bus and the second bus have different bus widths.

12. The system of claim 8, wherein the request is a read request and the bus interface includes at least one read data buffer comprising a plurality of registers, and wherein the system further comprises means for employing the start address to point to a particular register of the plurality of registers of the at least one read data buffer to begin placing the received data in the at least one read data buffer, and for placing the received data in successively incremented registers of the at least one read data buffer until the size of the requested data is reached.

13. The system of claim 8, further comprising means for repeating the exclusive ORing of the start address of the data and the current value of the unload address generator in successive unload data cycles until reaching the size of the associated data.

14. The system of claim 8, wherein the data comprises multiple data words, and wherein the means for outputting comprises means for beginning the outputting of data from the plurality of registers of the at least one data buffer with an initial target data word of the request.

15. A system comprising:
    a bus bridge for coupling between a first bus and a second bus, the bus bridge including:
        at least one data buffer;
        data load logic to place received data in the at least one data buffer, wherein the data is received at the bus bridge from across the first bus in a first data ordering;
        data unload logic to automatically translate the received data from the first data ordering to a second data ordering during unloading of the data from the at least one data buffer, wherein the first data ordering and the second data ordering are each a different one of a linear data ordering and an interleaved data ordering;

wherein the data is received at the bus bridge pursuant to a request, and wherein the bus bridge further comprises means for obtaining from the request a start address and a size of data associated with the request to be translated, and wherein the data unload logic employs the start address of the data to automatically translate the data from the first data ordering to the second data ordering; and wherein the second data ordering is the interleaved data ordering, and the at least one data buffer includes a plurality of registers, and wherein the data unload logic outputs data with the interleaved data ordering in successive unload data cycles from the plurality of registers of the at least one data buffer by exclusive ORing the start address of the data with a current value of an unload address generator, wherein the unload address generator is initialized to zero and is incremented with each successive unload data cycle of the outputting of the data.

16. The system of claim 15, wherein the data unload logic unloads the data from the at least one data buffer for transfer across the second bus, and the received data at the bus bridge is responsive to a read request initiated by a requestor coupled to the second bus, and wherein the requestor requests the read data in the second data ordering.

17. The system of claim 15, wherein the first bus and the second bus have different bus widths.

18. The system of claim 15, wherein the request is a read request and the at least one data buffer includes a plurality of registers, and wherein the data load logic employs the start address to point to a particular register of the plurality of registers of the at least one data buffer to begin placing the received read data in the at least one data buffer, and for placing the received read data into successively incremented registers of the at least one data buffer until the size of the requested data is reached.

19. The system of claim 15, wherein the data unload logic repeats the exclusive ORing of the start address of the data and the current value of the unload address generator in successive unload data cycles until reaching the size of the associated data.

20. The system of claim 15, wherein the data comprises multiple data words, and wherein the data unload logic begins the outputting of the data from the plurality of registers of the at least one data buffer with an initial target data word of the request.

* * * * *